(12) United States Patent
Wang et al.

(10) Patent No.: US 12,503,371 B2
(45) Date of Patent: Dec. 23, 2025

(54) METHOD FOR STRENGTHENING BIOLOGICAL MANGANESE OXIDATION USING MAGNETIC FIELD AND USE THEREOF

(71) Applicant: TONGJI UNIVERSITY, Shanghai (CN)

(72) Inventors: Mei Wang, Shanghai (CN); Zuxin Xu, Shanghai (CN); Bin Dong, Shanghai (CN); Mengke Cui, Shanghai (CN); Sisi Chen, Shanghai (CN); Yifan Zeng, Shanghai (CN); Chun Lu, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 469 days.

(21) Appl. No.: 18/178,537

(22) Filed: Mar. 6, 2023

(65) Prior Publication Data

US 2023/0202855 A1  Jun. 29, 2023

Related U.S. Application Data

(63) Continuation of application No. PCT/CN2022/080127, filed on Mar. 10, 2022.

(30) Foreign Application Priority Data

Mar. 10, 2021 (CN) .......................... 202110258424.8

(51) Int. Cl.
  *C01F 5/04* (2006.01)
  *C12M 1/42* (2006.01)
  *C12N 1/20* (2006.01)
(52) U.S. Cl.
  CPC .............. *C01F 5/04* (2013.01); *C12M 35/06* (2013.01); *C12N 1/20* (2013.01); *C12N 2500/16* (2013.01); *C12N 2500/22* (2013.01)

(58) Field of Classification Search
  None
  See application file for complete search history.

(56) References Cited

FOREIGN PATENT DOCUMENTS

| CN | 101239229 | 8/2008 |
|----|-----------|--------|
| CN | 109173696 | 1/2019 |

(Continued)

OTHER PUBLICATIONS

English translation of UA-55767-C2 Description. (Year: 2006).*

(Continued)

*Primary Examiner* — Anthony J Zimmer
*Assistant Examiner* — Zachary John Baum
(74) *Attorney, Agent, or Firm* — JCIP GLOBAL INC.

(57) ABSTRACT

The present disclosure discloses a method for strengthening a biological manganese oxidation using a magnetic field and use thereof. The method includes steps of inoculating a manganese-oxidizing microorganism into a culture medium containing $Mn^{2+}$, performing magnetization treatment in a culture process, and then collecting a biogenic manganese oxide. The method includes steps of performing a primary magnetic field treatment at a magnetic field intensity of 0.2-50 mT for 1-5 h when culturing is performed for 6-12 h, continuing culturing after the primary magnetization treatment, and performing magnetization treatment once every other 24 h for culture time of 72 h. A magnetic field is applied to accelerate an oxidation rate of a manganese-oxidizing microorganism to $Mn^{2+}$ and a biological manganese oxidation rate is respectively improved by 36.4% and 23.8% under an action of an alternating magnetic field or a constant magnetic field within 72 h.

8 Claims, 2 Drawing Sheets

(56) References Cited

FOREIGN PATENT DOCUMENTS

| CN | 110655183 | 1/2020 |
| CN | 113186227 | 7/2021 |
| UA | 55767 C2 * | 7/2006 |
| UA | 30111 | 2/2008 |

OTHER PUBLICATIONS

Diaz-Alarcón, J.A., et al. Removal of iron and manganese in groundwater through magnetotactic bacteria. Journal of Environmental Management 249 (2019) 109381. (Year: 2019).*
Qu, Y., et al. Removal of hexavalent chromium from wastewater using magnetotactic bacteria. Separation and Purification Technology 136 (2014) 10-17. (Year: 2014).*
Tebo, B. M., et al. Geomicrobiology of manganese(II) oxidation. Trends in Microbiology 13 (2005) 421-428. (Year: 2005).*
Droz, B., et al. A comparison of the sorption reactivity of bacteriogenic and mycogenic Mn oxide nanoparticles. Environmental Science & Technology 49 (2015) 4200-4208. (Year: 2015).*
Liao, Shui-Jiao et al., "Application of manganese oxidizing bacteria and biogenic manganese oxide in remediation of environmental pollution:a review," Journal of Huazhong Agricultural University, vol. 32, No. 5, Sep. 2013, pp. 9-14.
"International Search Report (Form PCT/ISA/210) of PCT/CN2022/080127," with English translation thereof, mailed on Jun. 2, 2022, pp. 1-5.
"Written Opinion of the International Searching Authority (Form PCT/ISA/237) of PCT/CN2022/080127," mailed on Jun. 2, 2022, pp. 1-4.

* cited by examiner

METHOD FOR STRENGTHENING BIOLOGICAL MANGANESE OXIDATION USING MAGNETIC FIELD AND USE THEREOF

CROSS-REFERENCE TO RELATED APPLICATION

The present application is a continuation of PCT application No. PCT/CN2022/080127, filed on Mar. 10, 2022, which claims the priority benefits of China Application No. 202110258424.8, filed on Mar. 10, 2021. The entirety of each of the above mentioned patent applications is incorporated by reference herein and made a part of this specification.

BACKGROUND

Technical Field

The present disclosure relates to the technical field of environmental microorganisms and particularly relates to a method for strengthening a biological manganese oxidation using a magnetic field and use thereof.

Description of Related Art

Microbially catalyzed Mn (II) oxidation, including a surface catalytic reaction, is much more rapid than non-biotransformation. Thus, native manganese oxides in the environment are mostly produced by a biotransformation process. A catalytic oxidation process of free manganese ions by various microorganisms including bacteria and fungi is a most important way for forming various manganese oxide minerals in nature. Manganese oxides prepared by microbially catalyzed Mn (II) oxidation are defined as biogenic manganese oxides (BMO). Compared with a chemically synthesized manganese oxide, the biogenic manganese oxide has a characteristic of a large specific surface area. A weakly-crystallized biogenic manganese oxide has more octahedral cavities in a structure, a high valence state of manganese and a higher redox potential. Therefore, the biogenic manganese oxide is an oxidant and a catalyst with stronger oxidation and adsorption capacities on organic pollutants and heavy metals, and has a greater application potential than the chemically synthesized manganese oxide in treating trace organic pollutant wastewater and heavy metal wastewater. Manganese-oxidizing microorganisms widely exist in nature. However, most of the manganese-oxidizing microorganisms have a low manganese oxidation rate and are difficult to form dominant colonies. Therefore, how to strengthen a manganese oxidation process of the manganese-oxidizing microorganisms so as to quickly form the biogenic manganese oxides becomes a technical difficulty.

An action mechanism of microbially oxidized Mn (II) is mainly divided into a direct oxidation and an indirect oxidation. The indirect oxidation is mainly caused by a change of a surrounding microenvironment by growth and metabolism of microorganisms, such as increases of pH and Eh, consumption of $CO_2$ or acid, an increase of oxygen, a release of ammonia, generation of free radicals such as a hydroxyl group, increases of oxidation products such as $H_2O_2$ and a peroxide, generation of organic chelating agents and secreta of chelating agents of Mn (II), thereby promoting oxidation of manganese. The direct oxidation is mainly characterized in that microorganisms secrete some Mn binder components in growth and reproduction processes and produce a specific manganese oxidase to catalyze oxidation of manganese. Many manganese-oxidizing bacteria produce certain manganese oxide factors, such as proteins (enzymes), polysaccharide-protein complexes and some cell wall components. They enrich, bind and bond manganese ions or primary oxidation products of manganese both intracellularly and extracellularly, further causing an oxidation reaction of manganese.

Biomagnetism is a novel interdisciplinary subject. Researches are gradually deepened in recent years. There are researches for promoting growth of microorganisms or synthesis of metabolites of certain microorganisms by utilizing a magnetic field (a steady magnetic field and a low-frequency alternating magnetic field). The microorganisms carry more or less magnetic materials inside. Lift activities of the microorganisms will be affected by an action of an external magnetic field, an earth large magnetic field or a self-magnetic field. A response of the microorganisms to the action of the magnetic field is further called a microorganism magnetic effect. The magnetic field is loaded in a process of culturing the microorganisms. A growth of the microorganisms can be promoted and the amount of metabolites can be increased within a proper magnetic field parameter range using the microorganism magnetic effect. Therefore, an exploration on response phenomena of different microorganisms in different ranges of magnetic field parameters, such as growth promotion, metabolite production promotion, etc., is a hot spot of the current research.

The current research on an influence of the magnetic field on the microorganisms is still in a beginning stage. The influence of the magnetic field on a biological manganese oxidation process is not reported, such that an application of the magnetic field is limited. A method for strengthening a biological manganese oxidation using a magnetic field provides a new thought and method for improving a capacity of producing a biogenic manganese oxide by a manganese-oxidizing microorganism. However, it is an important problem to be solved that how to apply a magnetic field at a proper time point in a liquid culture process of the manganese-oxidizing microorganism, and determine a strength and an action time of the magnetic field to improve a biological manganese oxidation rate and a change of a characteristic of the produced biogenic manganese oxide.

SUMMARY

The present disclosure aims to accelerate a manganese oxidation of a manganese-oxidizing microorganism, quickly forms a biogenic manganese oxide, improves a reaction activity of the biogenic manganese oxide, and provides a method for strengthening a biological manganese oxidation using a magnetic field. The method increases a movement speed of a charged particle by applying a magnetic field, further improves a mass transfer efficiency, accelerates an oxidation rate of the manganese-oxidizing microorganism to $Mn^{2+}$, generates the biogenic manganese oxide with a small particle size and a large specific surface area, can accelerate adsorption and oxidation performances of the biogenic manganese oxide on heavy metals or trace organic pollutants in a water body or a solid matrix, and has a good application prospect.

The objectives of the present disclosure are achieved by the following technical solutions.

A method for strengthening a biological manganese oxidation using a magnetic field includes steps of inoculating a manganese-oxidizing microorganism into a culture medium containing $Mn^{2+}$, performing magnetization treatment in a culture process, and then collecting a biogenic manganese oxide. A magnetic field is applied in a manganese oxidation process of the manganese-oxidizing microorganism to accelerate a manganese oxidation rate and rapidly form a biogenic manganese oxide. The generated biogenic manganese oxide has a small particle size and a large specific surface area, and accelerates adsorption and oxidation performances on heavy metals or trace organic pollutants in a water body or a solid matrix.

The culture medium is a liquid culture medium or a solid culture medium. The magnetization treatment is as follows: performing a primary magnetization treatment at a magnetic field intensity of 0.2-50 mT for 1-5 h when culturing is performed for 6-12 h, continuing culturing after the primary magnetization treatment, and performing magnetization treatment once every other 24 h for culture time of 72 h.

The magnetic field is an alternating magnetic field or a constant magnetic field.

The manganese-oxidizing microorganism is a manganese-oxidizing bacterium or a manganese-oxidizing fungus. The manganese-oxidizing microorganism is a strain preserved in China General Microbiological Culture Collection Center (CGMCC), China Agricultural Microbial Species Preservation Management Center (ACCC), China Center of Industrial Culture Collection (CICC), National Center for Medical Culture Collections (CMCC), and the like, and a strain separated from an environment, such as a manganese-oxidizing microorganism separated from manganese ore accessory soil and water body.

The culture medium is an HAY liquid culture medium and includes the following components: 0.246 g/L of sodium acetate, 0.15 g/L of yeast powder, 0.05 g/L of magnesium sulfate heptahydrate, 5 mg/L of dipotassium hydrogen phosphate, and 2 mL/L of a mineral salt, a buffer solution in the culture medium is HEPES with a final concentration of 20 mM, and a pH is 6.5.

The mineral salt contains the following components: 3.7 g of calcium chloride dihydrate, 0.44 g of zinc sulfate heptahydrate, 0.29 g of sodium molybdate dihydrate, 2.5 g of boric acid, 5 mg of copper sulfate pentahydrate, and 1.0 g of ferric chloride hexahydrate.

The manganese-oxidizing microorganism is inoculated into a culture medium containing $Mn^{2+}$ and cultured in an oscillator shake flask at a rotating speed of 200 rpm in a dark place at 30° C. for 72 h. The biogenic manganese oxide generated after the magnetization has a small particle size and a large specific surface area, and can accelerate adsorption and oxidation performances on heavy metals or trace organic pollutants in a water body or a solid matrix.

A method for accelerating a removal of $Cd^{2+}$ in a water body or a solid matrix by a biogenic manganese oxide, wherein the biogenic manganese oxide is prepared using the method, and the method specifically includes the following steps: collecting and freeze-drying the magnetized biogenic manganese oxide, adding the biogenic manganese oxide into a water body or a solid matrix containing $Cd^{2+}$, and performing reaction at 25° C., a pH of 7.0 and 10 mM of $KNO_3$.

The water body includes industrial wastewater, domestic wastewater, underground water and tap water. The solid matrix includes soil and a sediment. Reaction kinetics of the magnetized biogenic manganese oxide on removing $Cd^{2+}$ is obviously faster than that of a control group. The magnetized biogenic manganese oxide can remove $Cd^{2+}$ within 60 min by 62% and the unmagnetized biogenic manganese oxide can only remove $Cd^{2+}$ by 47% even after 180 min.

Unless otherwise specified, the above operation steps and culture medium can be carried out by a conventional technique in the art.

A basic principle of the present disclosure is as follows: a magnetic field is used as an external physical stimulus, has a corresponding energy, and can stimulate an enzyme in a hyphae cell to change. The magnetic field improves a yield of an esterase isozyme in the manganese-oxidizing microorganism and enhances an activity of the enzyme. A biological manganese oxidation is a manifestation and process of a series of enzymatic reactions. A speed of the enzymatic reactions also directly depends on an enzymatic activity during reaction. Therefore, a magnetic field for promoting a biological manganese oxidation mainly reflects in that the magnetic field enhances activities of various enzymes. In addition, the magnetic field treatment may affect cytoplasmic enzymes containing important metal ions such as Mn, Cu, Zn, Fe and the like and membrane magnetic proteins on cell membranes, and further affects a series of physiological and biochemical reactions in which the enzymes and the proteins participate by changing activities, structures and functions of these proteases, such that the manganese-oxidizing microorganism can show a magnetic effect.

Compared with the prior art, the present disclosure has the following advantages:

1. $Mn^{2+}$ has paramagnetism. A weak magnetic field is used for regulating and controlling a migration process of ions/molecules so as to promote a manganese oxidation. The present disclosure performs magnetization treatment on a manganese-oxidizing microorganism. The magnetic field is used as a safe additional physical energy, does not involve in toxic, harmful and radioactive substances, does not endanger food safety of a bred variety, has a simple operation process, and is free of harms on operators.

2. The present disclosure uses a magnetic field intensity of 0.2-50 mT for processing for 1-5 h, which is to promote a synthesis of a biogenic manganese oxide in a liquid culture process of a manganese-oxidizing microorganism so as to improve a biological manganese oxidation rate. The synthesis of the biogenic manganese oxide is not influenced by a too low magnetic field intensity, the synthesis of the biogenic manganese oxide is inhibited by a too high magnetic field intensity, such that the magnetic field intensity and time are not selected randomly, and a creative labor is required. In addition, how long a time for starting a magnetic field treatment after inoculation and culture also has a very important influence on a generation of the biogenic manganese oxide. The method of the present disclosure is simple and efficient, and has a low cost and a good application prospect.

3. Under a condition of the magnetic field treatment used by the present disclosure, the biological manganese oxidation rate of all test strains is greatly improved compared with that of an untreated control strain. Adsorption and oxidation performances of the generated biogenic manganese oxide are obviously improved. The biogenic manganese oxide can be considered to be applied in treatment and restoration of a water environment and soil, and has a very great engineering application value.

DESCRIPTION OF THE EMBODIMENTS

Figure 1:
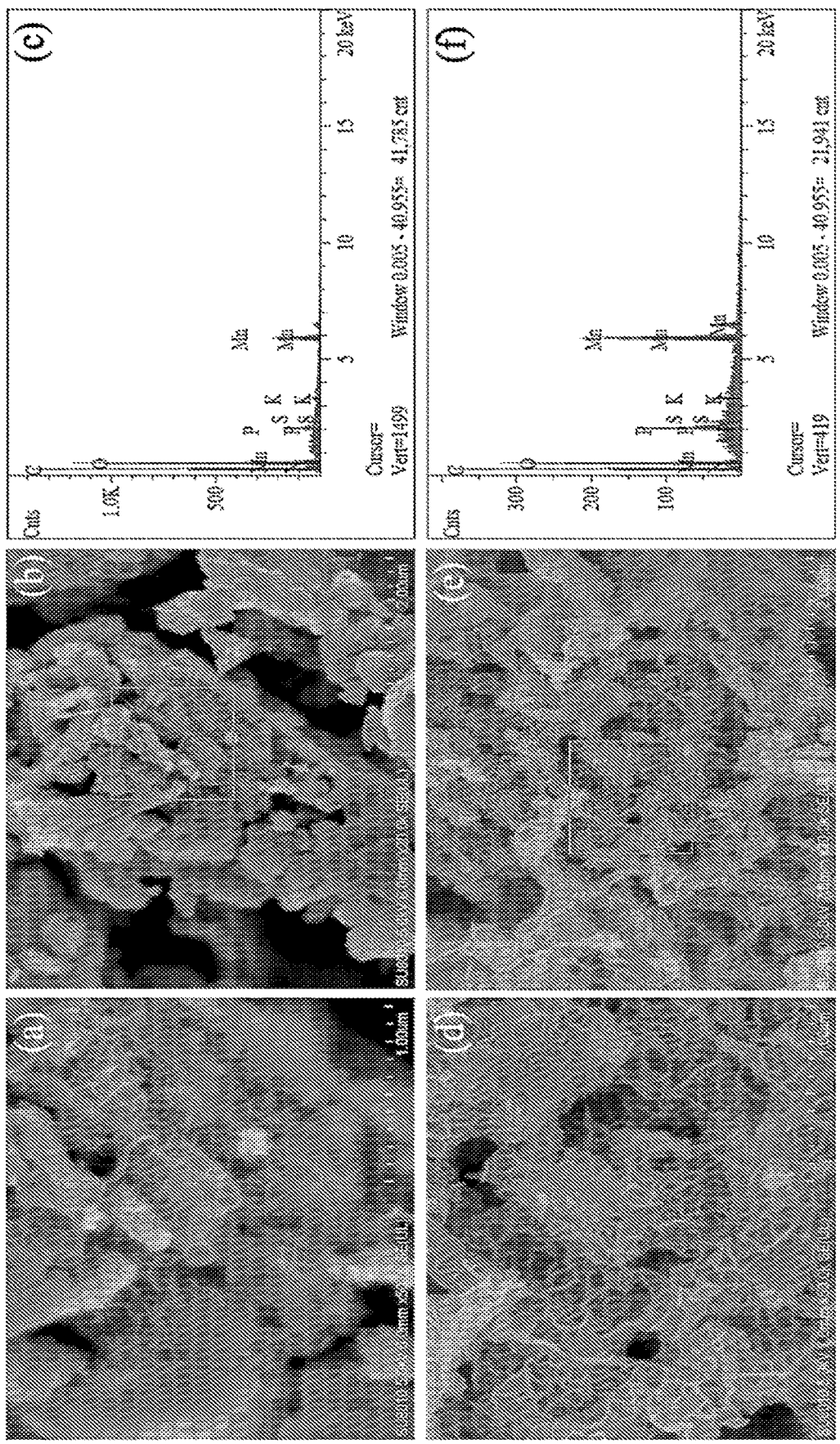
FIG. 1 shows scanning electron microscope (SEM) images and energy-dispersive X-ray spectroscopy (EDX) analysis diagrams of biogenic manganese oxides generated by magnetization/no-magnetization according to the present disclosure, wherein (a and b are a control group at magnifications of 1×10⁵ and 2×10⁵ respectively, and c is an energy-dispersive X-ray spectroscopy diagram of a marked place at 1; and d and e are an experimental group at magnifications of 1×10⁵ and 2×10⁵ respectively under an action of a magnetic field, and f is an energy-dispersive X-ray spectroscopy diagram of a marked place at 2)

A manganese oxidation rate used by the present disclosure is determined in the following manner: a manganese-oxidizing microorganism is cultured, a sample is taken at an interval of specific time, after the sample is filtered by a 0.45 μm filter membrane, a concentration of residual $Mn^{2+}$ in a culture solution is tested by an inductively coupled plasma emission spectrometer (Agilent, 5110 series), and the biological manganese oxidation rate is tested according to the following formula:

biological manganese oxidation rate (%)=$(C_0-C_t)/C_0$*100%;

in the formula:

$C_0$ is the content of $Mn^{2+}$ ions in an initial culture solution; and $C_t$ is the content of residual $Mn^{2+}$ ions in the culture solution at the time t.

In the following examples, methods are conventional methods unless otherwise specified and reagents are conventionally commercially available unless otherwise specified.

Example 1

A method for strengthening a biological manganese oxidation using a magnetic field specifically includes the following steps:

Strain culture: a liquid culture medium (culture medium for shake-flask culture) for culturing a manganese-oxidizing microorganism is an HAY culture medium and includes the following components: 0.246 g/L of sodium acetate, 0.15 g/L of yeast powder, 0.05 g/L of magnesium sulfate heptahydrate, 5 mg/L of dipotassium hydrogen phosphate, and 2 mL/L of a mineral salt (3.7 g of calcium chloride dihydrate, 0.44 g of zinc sulfate heptahydrate, 0.29 g of sodium molybdate dihydrate, 2.5 g of boric acid, 5 mg of copper sulfate pentahydrate, and 1.0 g of ferric chloride hexahydrate), a buffer solution in the culture medium is HEPES with a final concentration of 20 mM, and a pH is 6.5.

The manganese-oxidizing microorganism (*Cladosporium* sp. XM01, China General Microbiological Culture Collection Center, and preservation No.: CGMCC NO. 21083) is inoculated into the HAY liquid culture medium (an inoculation amount of 1×10⁵ conidia/mL), $Mn^{2+}$ with a final concentration of 400 μM and 20 mM of an HEPES buffer solution at a pH of 6.5 are added in a filtration mode, and the microorganism is cultured in an oscillator shake flask at a rotating speed of 200 rpm in a dark place at 30° C. A primary alternating magnetization treatment is performed at a magnetic field intensity of 2-10 mT for 3 h when culturing is performed for 9 h, culturing is continued after the primary magnetization treatment, magnetization treatment is performed once every other 24 h for culture time of 72 h, a sample is taken and filtered by a 0.45 μm filter membrane, a concentration of residual $Mn^{2+}$ in a culture solution is tested by an inductively coupled plasma emission spectrometer (Agilent, 5110 series), and thus the manganese oxidation rate is calculated. The control group is not magnetized. As shown in Table 1, the biological manganese oxidation rate under magnetization is obviously improved compared with the control group, wherein the biological manganese oxidation rate is improved by 36.4% at 72 h.

Example 2

The steps different from example 1 are that: after inoculation and culture for 6 h, an alternating magnetic field treatment is performed, then magnetization treatment is performed once every other 24 h for 3 h each treatment time at a magnetic field intensity of 2-10 mT, a manganese oxidation rate at 72 h is shown in Table 1, and compared with the control group, the manganese oxidation rate is improved by 20.8%.

Example 3

The steps different from example 1 are that: after inoculation and culture for 12 h, an alternating magnetic field treatment is performed, then magnetization treatment is performed once every other 24 h for 3 h each treatment time at a magnetic field intensity of 2-10 mT, a manganese oxidation rate at 72 h is shown in Table 1, and compared with the control group, the manganese oxidation rate is improved by 11.9%.

Example 4

The steps different from example 1 are that: after inoculation and culture for 9 h, an alternating magnetic field treatment is performed, then magnetization treatment is performed once every other 24 h for 1 h each treatment time at a magnetic field intensity of 2-10 mT, a manganese oxidation rate at 72 h is shown in Table 1, and compared with the control group, the manganese oxidation rate is improved by 7.1%.

Example 5

The steps different from example 1 are that: after inoculation and culture for 9 h, an alternating magnetic field treatment is performed, then magnetization treatment is performed once every other 24 h for 5 h each treatment time at a magnetic field intensity of 2-10 mT, a manganese oxidation rate at 72 h is shown in Table 1, and compared with the control group, the manganese oxidation rate is improved by 17.3%.

Example 6

The steps different from example 1 are that: after inoculation and culture for 9 h, a constant magnetic field treatment is performed, then magnetization treatment is performed once every other 24 h for 3 h each treatment time at a magnetic field intensity of 0.2-20 mT, a manganese oxidation rate at 72 h is shown in Table 1, and compared with the control group, the manganese oxidation rate is improved by 10.4%.

Example 7

The steps different from example 1 are that: after inoculation and culture for 9 h, a constant magnetic field treatment is performed, then magnetization treatment is performed once every other 24 h for 5 h each treatment time at a magnetic field intensity of 0.2-20 mT, a manganese oxidation rate at 72 h is shown in Table 1, and compared with the control group, the manganese oxidation rate is improved by 23.8%.

Example 8

The steps different from example 1 are that: after inoculation and culture for 9 h, a constant magnetic field treatment is performed, then magnetization treatment is performed once every other 24 h for 5 h each treatment time at a magnetic field intensity of 0.2-50 mT, a manganese oxidation rate at 72 h is shown in Table 1, and compared with the control group (not magnetized), the manganese oxidation rate is improved by 1.3%.

TABLE 1

Biological manganese oxidation rates of different examples at 72 h

| No. | Process mode | Biological manganese oxidation rate (72 h) |
| --- | --- | --- |
| 1 | Control group | 58.3% |
| 2 | Example 1 | 94.7% |
| 3 | Example 2 | 79.1% |
| 4 | Example 3 | 70.2% |
| 5 | Example 4 | 65.4% |
| 6 | Example 5 | 75.6% |
| 7 | Example 6 | 68.7% |
| 8 | Example 7 | 82.1% |
| 9 | Example 8 | 59.6% |

It can be seen from Table 1 that how long after inoculation and culture, magnetization treatment, a magnetic field intensity and treatment time have very important influences on the biological manganese oxidation rate. Through data in example 1, the biological manganese oxidation rate is improved by 36.4% compared with the control group when a primary alternating magnetic field treatment is performed at a magnetic field intensity of 0.2-10 mT for 3 h when culturing is performed for 9 h.

Example 9

Scanning electron microscope (SEM) images and energy-dispersive X-ray spectroscopy (EDX) analysis diagrams of biogenic manganese oxides generated under an action of a magnetic field or not.

The manganese-oxidizing microorganism (*Cladosporium* sp. XM01, China General Microbiological Culture Collection Center, and preservation No.: CGMCC NO. 21083) is inoculated into the HAY liquid culture medium (an inoculation amount of 1×10⁵ conidia/mL), $Mn^{2+}$ with a final concentration of 400 μM and 20 mM of an HEPES buffer solution at a pH of 6.5 are added in a filtration mode, and the microorganism is cultured in an oscillator shake flask at a rotating speed of 200 rpm in a dark place at 30° C. A primary alternating magnetic field treatment is performed at a magnetic field intensity of 0.2-10 mT for 3 h when culturing is performed for 9 h, culturing is continued after the primary magnetization treatment, magnetization treatment is performed once every other 24 h, a biogenic manganese oxide is collected 3 d later, a culture solution is centrifuged at 5,000 r/min for 10 min, a biogenic manganese oxide suspension is then washed with sterile water three times to wash away ions on a surface, and the biogenic manganese oxide is freeze-dried and subjected to a scanning electron microscope observation and an energy-dispersive X-ray spectroscopy analysis.

Figure 2:
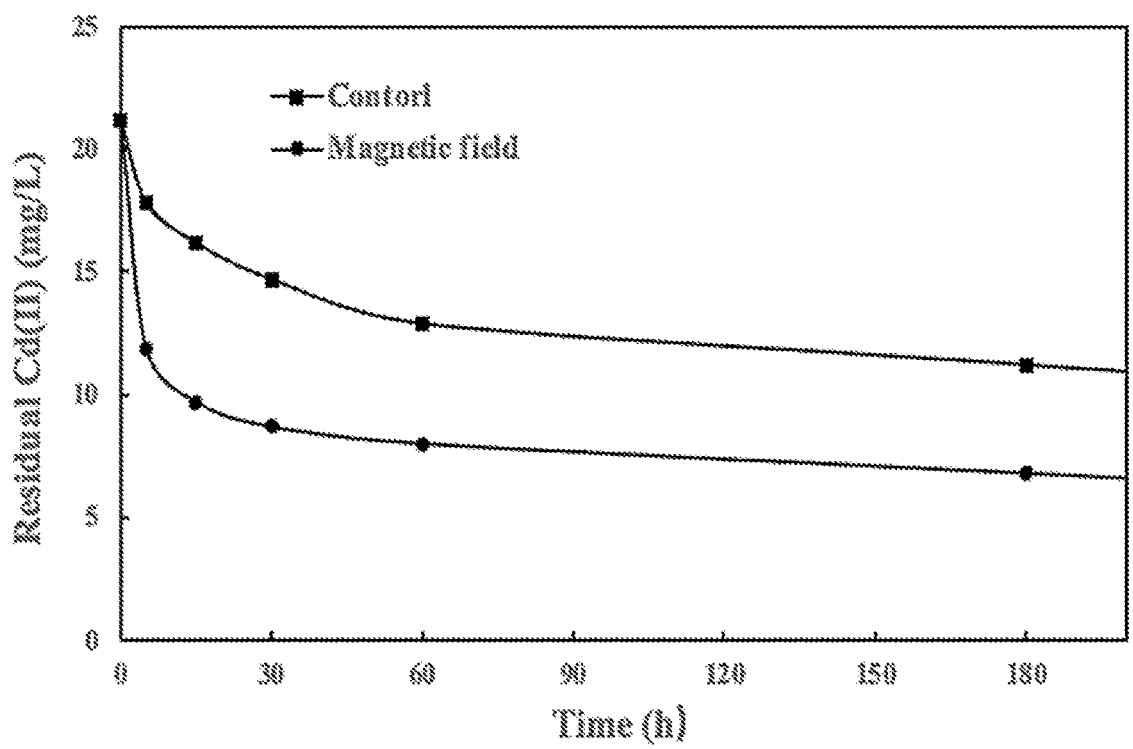
FIG. 2 shows an influence of magnetization on reaction kinetics of removing $Cd^{2+}$ in a water body by biogenic manganese oxides.

A result of the scanning electron microscope images combined with the energy-dispersive X-ray spectroscopy analysis is shown in FIG. 2. Compared with the scanning electron microscope images of control groups 2a and 2b, FIGS. 2d and 2e show that the magnetized biogenic manganese oxide is still a nano-scale manganese oxide, has an irregular shape and a poor crystallinity. However, the biogenic manganese oxide has a small particle size and a large specific surface area after the magnetization treatment, and accelerates adsorption and oxidation performances on heavy metals or trace organic pollutants in a water body or a solid matrix.

It can be seen from FIGS. 2c and 2f that the carbon content of an extracellular metabolite (biogenic manganese oxide) of the manganese-oxidizing microorganism after the magnetization treatment is obviously reduced, while the content of manganese is obviously increased by 15%, which indicates that the magnetic field accelerates biomineralization of the manganese-oxidizing microorganism and increases a manganese oxidation rate.

Example 10

Influence of Magnetic Field on Reaction Kinetics of Removing $Cd^{2+}$ in Water Body by Biogenic Manganese Oxides The manganese-oxidizing microorganism (*Cladosporium* sp. XM01, China General Microbiological Culture Collection Center, and preservation No.: CGMCC NO. 21083) is inoculated into the HAY liquid culture medium (an inoculation amount of 1×10⁵ conidia/mL), $Mn^{2+}$ with a final concentration of 400 μM and 20 mM of an HEPES buffer solution at a pH of 6.5 are added in a filtration mode, and the microorganism is cultured in an oscillator shake flask at a rotating speed of 200 rpm in a dark place at 30° C. A primary alternating magnetic field treatment is performed at a magnetic field intensity of 0.2-10 mT for 3 h when culturing is performed for 9 h, culturing is continued after the primary magnetization treatment, magnetization treatment is performed once every other 24 h, a biogenic manganese oxide is collected 3 d later, a culture solution is centrifuged at 5,000 r/min for 10 min, a biogenic manganese oxide suspension is then washed with sterile water three times to wash away ions on a surface, and the biogenic manganese oxide is freeze-dried at −50° C. using a freeze-drying agent and then stored in a 26° C. aerobic incubator for later use.

A reaction of removing $Cd^{2+}$ from a water body by the biogenic manganese oxide is performed in a fully mixed reactor. 0.3 g/L of the biogenic manganese oxide is added into water containing 21.9 mg/L of $Cd^{2+}$ at a pH of 7.0 and 10 mM of $KNO_3$.

As shown in FIG. 2, reaction kinetics of the magnetized biogenic manganese oxide on removing $Cd^{2+}$ is obviously faster than that of a control group. The magnetized biogenic manganese oxide can remove $Cd^{2+}$ within 60 min by 62% and the unmagnetized biogenic manganese oxide can only remove $Cd^{2+}$ by 47% even after 180 min.

Example 11

The magnetic field can improve a dehydrogenase activity (NADH dehydrogenase and succinate dehydrogenase) and an electron transfer chain activity of a manganese-oxidizing microorganism. An action mechanism is that the different manganese-oxidizing microorganisms have a common action and play a role in accelerating a biological manganese oxidization process. Therefore, it can be inferred that when the magnetic field intensity is 0.2-50 mT in the present application, the magnetic field has both positive influences on manganese-oxidizing fungi and manganese-oxidizing bacteria. Besides, the positive influence on the mainstream manganese-oxidizing bacteria or manganese-oxidizing fungi at present can be realized.

Figure 3:
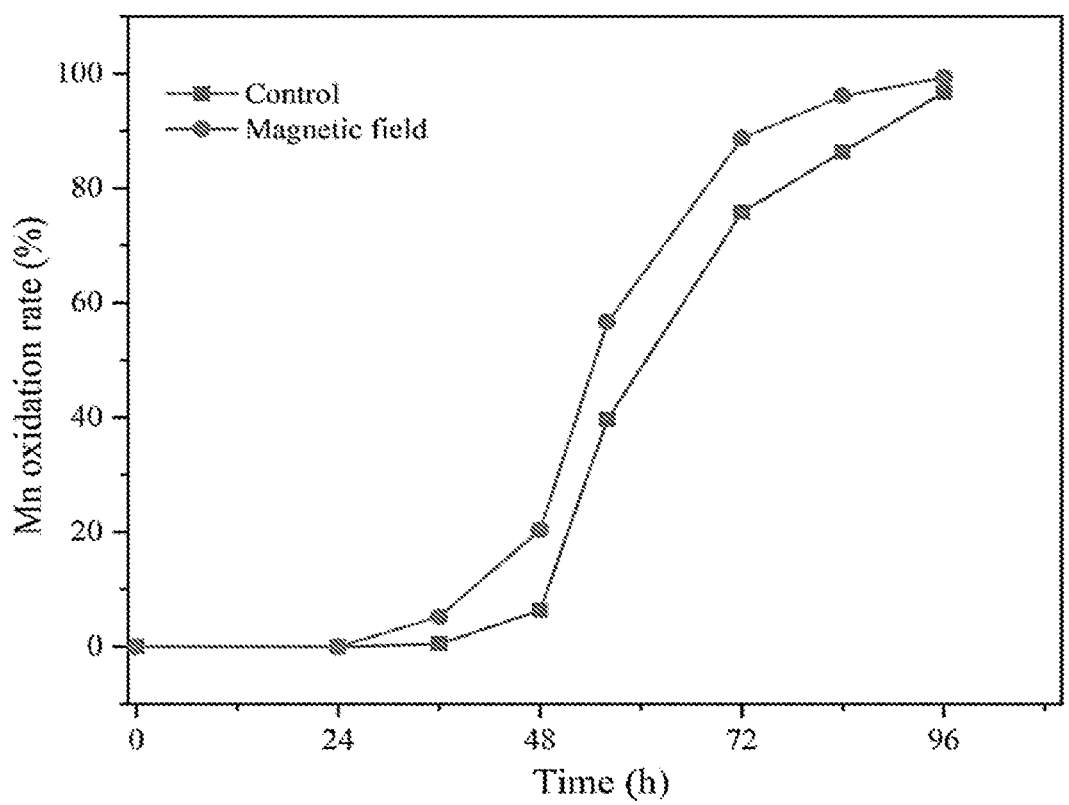
FIG. 3 shows a manganese oxidation rate of *Pseudomonas putida* MnB1 at an initial dose of 400 μM $Mn^{2+}$ under a magnetic field condition as a change of culture time.

In order to verify that when the magnetic field intensity is 0.2-50 mT in the present application, the manganese-oxidizing fungi and the manganese-oxidizing bacteria are positively influenced. The applicant performs an experiment on the most common manganese-oxidizing microorganisms before:

currently, the manganese-oxidizing bacteria are mainly concentrated on these three model bacteria: *Pseudomonas putida* MnB1 and GB-1, gram-negative bacteria, produce a manganese oxide on a cell surface, and live mainly in fresh water and soil; *Bacillus* SG-1, a gram-positive rod-shaped bacterium, produces manganese-oxidizing spores; and *Leptothrix discophora* SS-1 and SP-6 are flaky bacteria living in fresh water and deposit a manganese oxide on their cell sheaths. In order to investigate an influence of the magnetic field on common manganese-oxidizing bacteria, a common manganese-oxidizing bacterium *Pseudomonas putida* MnB1 is selected. The strain is given by associate professor Tong Man, China University of Geosciences, Wuhan. The influence of the magnetic field on a manganese oxidation of the *Pseudomonas putida* MnB1 is investigated. The specific experimental steps and results are as follows:

after the strain stored in a 4° C. refrigerator is activated of for 6-8 h, the strain is inoculated into an LP liquid culture medium at a ratio of 5%, $Mn^{2+}$ with a final concentration of 400 μM and an HEPES buffer solution (20 mM, pH 7.5) are added in a 0.22-μM filter membrane filtration mode, and the strain is cultured in an oscillator shake flask at a rotating speed of 200 rpm in a dark place at 25° C. A primary magnetization treatment is performed at a magnetic field intensity of 0.2-50 mT for 5 h when culturing is performed for 6 h, culturing is continued after the primary magnetization treatment, and magnetization treatment is performed once every other 24 h for culture time of 96 h. Samples are taken at 0 h, 24 h, 36 h, 48 h, 56 h, 72 h, 84 h and 96 h, respectively and filtered by a 0.45-μm filter membrane. A concentration of residual $Mn^{2+}$ in a culture solution is tested by an inductively coupled plasma emission spectrometer (Agilent, 5110 series), and the manganese oxidation rate is calculated. The results are shown in FIG. 3. As can be seen from the figure, the magnetic field significantly increases the manganese oxidation rate compared to the control group, for example, at 56 h the manganese oxidation rate is increased by 17.0%. From the above results, it can be seen that in the present application, when the magnetic field intensity is 0.2-50 mT, the magnetic field also has a positive influence on the manganese-oxidizing bacteria. Besides, the positive influence on the mainstream manganese-oxidizing bacteria or manganese-oxidizing fungi at present can be realized.

The above description of the examples is intended to facilitate a person of ordinary skill in the art to understand and use the present disclosure. Obviously, a person skilled in the art can easily make various modifications to these examples, and apply a general principle described herein to other examples without creative efforts. Therefore, the present disclosure is not limited to the above examples. All improvements and modifications made by a person skilled in the art according to implication of the present disclosure without departing from the spirit of the present disclosure should fall within the protection scope of the present disclosure.

What is claimed is:

1. A method for strengthening a biological manganese oxidation using a magnetic field, comprising steps of inoculating a manganese-oxidizing microorganism into a culture medium containing $Mn^{2+}$, performing magnetization treatment in a culture process, and then collecting a biogenic manganese oxide.

2. The method for strengthening a biological manganese oxidation using a magnetic field according to claim 1, wherein the magnetization treatment is as follows: performing a primary magnetization treatment at a magnetic field intensity of 0.2-50 mT for 1-5 h when culturing is performed for 6-12 h, continuing culturing after the primary magnetization treatment, and performing magnetization treatment once every other 24 h for culture time of 72 h.

3. The method for strengthening a biological manganese oxidation using a magnetic field according to claim 2, wherein the magnetic field is an alternating magnetic field or a constant magnetic field.

4. The method for strengthening a biological manganese oxidation using a magnetic field according to claim 1, wherein the manganese-oxidizing microorganism is a manganese-oxidizing bacterium or a manganese-oxidizing fungus.

5. The method for strengthening a biological manganese oxidation using a magnetic field according to claim 1, wherein the culture medium is a liquid culture medium.

6. The method for strengthening a biological manganese oxidation using a magnetic field according to claim 5, wherein the culture medium is an HAY liquid culture medium and comprises the following components: 0.246 g/L of sodium acetate, 0.15 g/L of yeast powder, 0.05 g/L of magnesium sulfate heptahydrate, 5 mg/L of dipotassium hydrogen phosphate, and 2 mL/L of a mineral salt, a buffer solution in the culture medium is HEPES with a final concentration of 20 mM, and a pH is 6.5.

7. The method for strengthening a biological manganese oxidation using a magnetic field according to claim 6, wherein the mineral salt contains the following components: 3.7 g of calcium chloride dihydrate, 0.44 g of zinc sulfate heptahydrate, 0.29 g of sodium molybdate dihydrate, 2.5 g of boric acid, 5 mg of copper sulfate pentahydrate, and 1.0 g of ferric chloride hexahydrate.

8. The method for strengthening a biological manganese oxidation using a magnetic field according to claim 1, wherein the manganese-oxidizing microorganism is inoculated into a culture medium containing $Mn^{2+}$ and cultured in an oscillator at a rotating speed of 200 rpm in a dark place at 30° C. for 72 h.

* * * * *